United States Patent
Bouchard

(10) Patent No.: US 8,024,100 B2
(45) Date of Patent: Sep. 20, 2011

(54) METHOD OF CONTROLLING THE PATH OF A VEHICLE

(75) Inventor: Christophe Bouchard, Argenteuil (FR)

(73) Assignee: Robert Bosch GmbH, Stuttgart (DE)

( * ) Notice: Subject to any disclaimer, the term of this patent is extended or adjusted under 35 U.S.C. 154(b) by 1073 days.

(21) Appl. No.: 11/837,018

(22) Filed: Aug. 10, 2007

(65) Prior Publication Data
US 2008/0051966 A1 Feb. 28, 2008

(30) Foreign Application Priority Data
Aug. 28, 2006 (FR) ...................................... 06 07603

(51) Int. Cl.
*B60T 7/12* (2006.01)
(52) U.S. Cl. .......................................................... 701/70
(58) Field of Classification Search .................... 701/70, 701/124; 180/232; 188/378–380
See application file for complete search history.

(56) References Cited

U.S. PATENT DOCUMENTS

| 5,790,967 A | * | 8/1998 | Kull et al. ........................ 701/51 |
| 6,167,357 A | * | 12/2000 | Zhu et al. ....................... 702/175 |
| 2004/0167705 A1 | * | 8/2004 | Lingman et al. .............. 701/124 |

FOREIGN PATENT DOCUMENTS

| DE | 4446358 C1 | 12/1995 |
| DE | 10245270 A1 | 4/2004 |
| EP | 1387153 A1 | 2/2004 |

OTHER PUBLICATIONS

FR0607603 Search Report and Opinion.

* cited by examiner

*Primary Examiner* — Yonel Beaulieu
(74) *Attorney, Agent, or Firm* — Michael Best & Friedrich LLP

(57) ABSTRACT

Method for determining the gradient on which a motor vehicle is traveling, comprising a step (44) of detecting disengagement of the clutch, a step (46) of measuring the variation in speed of the vehicle on the gradient when the clutch is disengaged, a step (48) of estimating the vehicle load, and a comparison (50) with calibration curves stored in memory and providing deceleration values for various gradients and various vehicle loads at various vehicle speeds.

15 Claims, 2 Drawing Sheets

METHOD OF CONTROLLING THE PATH OF A VEHICLE

BACKGROUND OF THE INVENTION

The invention relates to a method for determining the gradient of a roadway on which a motor vehicle is traveling, and for determining the mass of the vehicle and to a device for controlling the path of the vehicle using the mass value thus determined.

SUMMARY OF THE INVENTION

Present-day motor vehicles are equipped with driving aid systems, particularly with anti-lock braking systems (ABS), electronic stability programs (ESP) for controlling the path of the vehicle, and/or with traction control systems (TC) for preventing the driven wheels from spinning, and these systems are capable, according to the circumstances, of modifying the braking force applied to each wheel of the vehicle or of generating a braking force.

The systems for controlling the path are particularly designed to estimate, in real time, and while the vehicle is running, the load of the vehicle, that is to say its total weight, so as to be able to take the estimated load into consideration when adjusting the interventions performed.

However, the load estimate is dependent on the estimate of the gradient of the roadway on which the vehicle is running and this gradient estimate is currently somewhat imprecise, one known means of estimating it being to fit the vehicle with a tilt sensor, this having the disadvantage of increasing the cost and complexity of the system.

It is an object of the invention to avoid these disadvantages by using a method for determining the gradient that is simple, effective and economical.

To these ends, the invention proposes a method for determining the gradient of a roadway on which a motor vehicle is traveling, characterized in that it consists in measuring the variation in speed of the vehicle on the gradient when the engine and the transmission connected to the driven wheels of the vehicle are uncoupled, and, from this variation, in deducing an estimated value for the gradient by comparing this variation against pre-established calibration curves or, advantageously, by calculation using a mathematical module.

This method allows the gradient of the roadway to be determined relatively precisely and quickly from information that is available and the acquisition of which does not entail installing an additional sensor.

Advantageously, the variation in vehicle speed on the gradient is determined during a gearshift, in the space of time corresponding to the engine being uncoupled from the driven wheels.

According to another feature of the invention, this method also consists in determining, advantageously by calculation, the mass of the vehicle traveling along the gradient.

Advantageously, this estimated value of the gradient is then used to correct the estimated vehicle load value.

This better estimate of the vehicle load, combined with the estimate of the gradient, allows systems of the ABS, ESP and TC type to operate more accurately and in a way better suited to the conditions in which the vehicle is traveling.

In the preferred embodiment of the invention, the variation in vehicle speed is determined from information supplied by the tachometer of this vehicle or advantageously by the rotational speed sensors fitted to the wheels.

The method also consists in determining the moments when the vehicle is uncoupled from the driven wheels on the basis of information supplied by the ESP computer, the engine injection computer, or the like.

Another subject of the present invention is a vehicle comprising an engine, a clutch (E), wheels and means for monitoring the rotational speed of the wheels, characterized in that it comprises means for measuring the gradient $\alpha$ of the vehicle by measuring the acceleration $\gamma$ of the vehicle running along the said gradient, with the engine disengaged.

Another subject of the present invention is a vehicle characterized in that it comprises processing means calculating the gradient $\alpha$ with respect to the horizontal as determined by the formula:

$$\alpha = \text{Arc sin}((\gamma - g\,\text{Kroll} - K\,v^2/m_e)/g)$$

where $\gamma$ is the measured acceleration of the vehicle, $g = 9.8\,\text{ms}^{-2}$, Kroll is the rolling resistance of the vehicle, K is the aerodynamic resistance of the vehicle, v is the speed of the vehicle and $m_e$ is the estimated mass of the vehicle.

Another subject of the present invention is a vehicle characterized in that it comprises means for determining the mass m of the vehicle as a function of the measured gradient.

Another subject of the present invention is a vehicle characterized in that it comprises a hydraulic control unit for operating hydraulic brakes which are positioned at the wheels in order individually to reduce the rotational speed of the wheels when this speed exceeds the speed desired for ensuring that the vehicle follows the path desired by the driver.

BRIEF DESCRIPTION OF THE DRAWINGS

The invention will be better understood, and other features, details and advantages thereof will become more clearly apparent from reading the description which follows, which is given by way of example with reference to the attached drawings in which.

DETAILED DESCRIPTION

Figure 1:
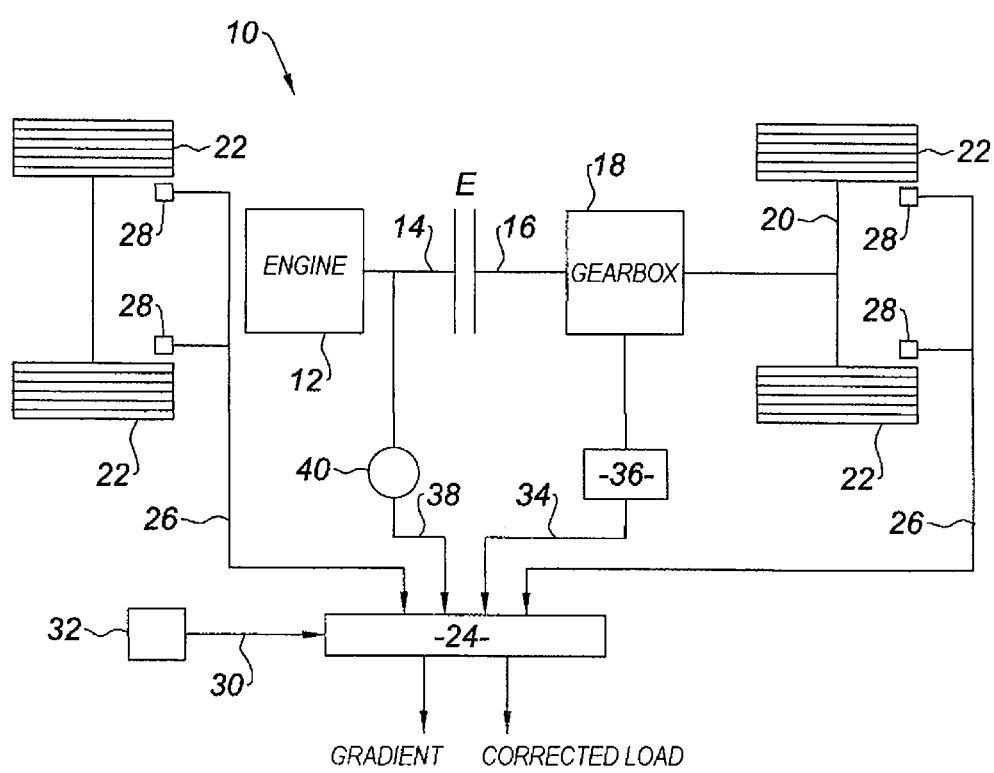
FIG. 1 depicts, in the form of a block diagram, the structure of a motor vehicle equipped with a gradient-determining means according to the invention.

In FIG. 1, the reference 10 denotes, in general, a motor vehicle, of which the internal combustion engine 12 via a clutch E connecting its output shaft 14 to the input shaft 16 of a gearbox 18 and a drive line 20, drives the wheels 22 of the vehicle.

The means for determining the gradient according to the invention comprise data processing means 24 which receive at input a signal 26 representative of the speed of the vehicle and supplied by a sensor 28 that senses the rotational speed of the wheels 22, a signal 34 that the clutch has been let out, this signal being supplied by gearshift means 36 (which may be controlled by the driver of the vehicle or may be automated in the case of an automatic gearbox) and/or a signal 38 representative of the rotational speed of the engine output shaft and supplied by an appropriate sensor 40.

Advantageously, the ESP computer, also associated with a hydraulic unit equipped, in the known way, with a hydraulic pump and with valves connected to the brakes, acts as data processing means 24.

A space of time during which the engine is uncoupled from the driven wheels may in fact be determined either from information relating to the status of the gearshift means 36 or by comparing the vehicle speed 26 against the rotational speed of the engine, a non-linear relationship in the variation of these two speeds indicating that the engine has been uncoupled from the driven wheels of the vehicle.

The variation in vehicle speed during the space of time in which the clutch E is let out, is a data item that allows the gradient of the roadway along which the vehicle is traveling to be calculated.

This is because the sum of the forces applied to the vehicle ΣF is equal to the product of the mass m of the vehicle under load times the acceleration γ:

$$\Sigma F = m\gamma$$

The sum of the forces is equal to the sum of the rolling resistance Froll_drag, of the aerodynamic drag Faero and the force Fslope resulting from the acceleration due to gravity on a gradient of angle α with respect to the horizontal.

$$F = mg \, Kroll$$

g being equal to 9.8 ms$^{-2}$

Kroll being a constant for the vehicle that can be measured during vehicle design.

$$Faero = Kv^2$$

K being an aerodynamic constant of the vehicle and v being the speed of the vehicle $$Fslope = mg \sin \alpha$$

From this, it can be deduced that:

$$= \arcsin((\gamma - g \, Kroll - K \, v^2/m)/g)$$

At first glance, it would seem that the equation cannot be solved in so far as α is dependent on the mass m of the vehicle, the extreme values of which, that is to say the unladen mass and the all up weight of the vehicle, are not known.

By examining the values of deceleration as a function of speed, for a number of the gradients in the table below, it can be seen that, surprisingly, at low speeds, the mass has a negligible influence on the deceleration:

| Speed (km/h) | Model: load (kg): 1650 - gradient (%): 0 | Model: load (kg): 1930 - gradient (%): 0 | Model: load (kg): 1650 - gradient (%): 5 | Model: load (kg): 1930 - gradient (%): 5 |
|---|---|---|---|---|
| 0 | 0.14 | 0.14 | 0.63 | 0.63 |
| 18 | 0.14 | 0.14 | 0.63 | 0.63 |
| 36 | 0.16 | 0.16 | 0.65 | 0.65 |
| 54 | 0.19 | 0.19 | 0.68 | 0.68 |
| 72 | 0.24 | 0.22 | 0.73 | 0.71 |
| 90 | 0.29 | 0.27 | 0.79 | 0.76 |
| 108 | 0.36 | 0.33 | 0.85 | 0.82 |

It is therefore possible to calculate, with sufficient precision, the gradient α by adopting a mean value for m.

As an alternative, the gradient α can be determined by comparing the measured values against the values in a calibration table similar to Table 1 but comprising data regarding all the gradients likely to need to be measured.

From the gradient value α the effective mass of the vehicle is calculated, this corresponding to the unladen mass increased by the load of the vehicle.

Knowledge of the effective mass of the vehicle makes it possible to improve the way in which the path of the vehicle is controlled.

In a first exemplary embodiment, the mass is used to deduce the actual value of the drag opposing forward progress of the vehicle so as to increase the value of the braking torque at the brakes to the actual limit of skidding.

Thus, according to the invention, the stopping distances of the vehicle can be shortened.

In a second exemplary embodiment, the threshold of intervention of the ESP device used to control the path of the vehicle intervenes in an optimum fashion in a bend with low adhesion, for example on wet or icy ground.

In a third exemplary embodiment, the ESP trigger thresholds are modified according to the mass of the vehicle.

Figure 2:
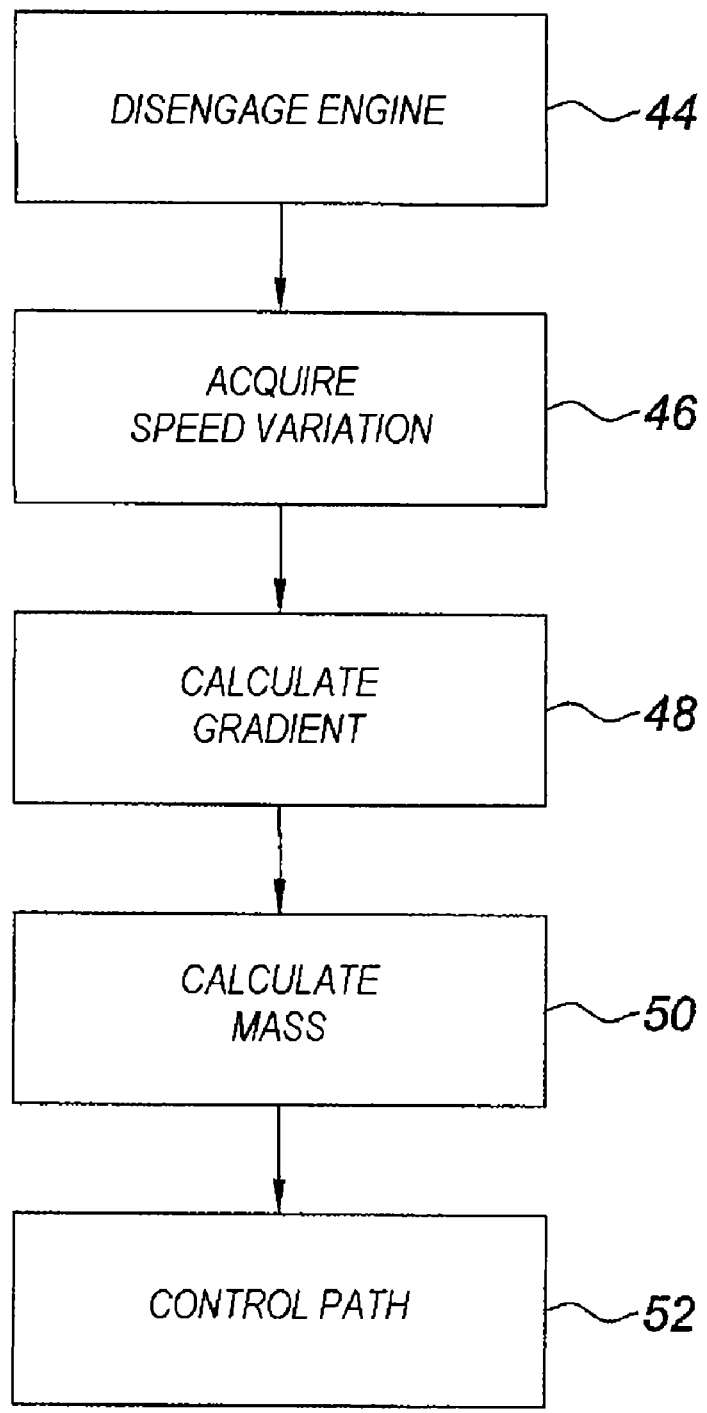
FIG. 2 is a flow chart depicting the various steps in the method according to the invention.

The main steps in the method according to the invention are depicted schematically in FIG. 2.

The first step 44 is to detect that the engine has been disengaged.

The next step 46 involves acquiring the variation in vehicle speed during the space of time in which the engine is disengaged. For example, it might be possible to measure the vehicle speed at two different instants and to divide the difference in speed by the space of time between these two instants or alternatively it may be possible to perform this calculation by derivation of the vehicle speed signal.

At the same time, the step 48 consists in calculating the gradient α.

From the gradient value, the total mass of the vehicle can be calculated as it is running.

The corrected load value is then taken into consideration by the systems of the ABS, ESP and TC type in order to adjust the way in which they intervene 52.

The invention claimed is:

1. Vehicle comprising an engine (12), a clutch (E), wheels (22) and means for monitoring the rotational speed of the wheels, characterized in that the vehicle comprises means for measuring the gradient α of the vehicle by measuring the acceleration γ of the vehicle running along the gradient, with the engine (12) disengaged.

2. Vehicle comprising an engine (12), a clutch (E), wheels (22) and means for monitoring the rotational speed of the wheels, characterized in that the vehicle comprises means for measuring the gradient α of the vehicle by measuring the acceleration γ of the vehicle running along the gradient, with the engine (12) disengaged, characterized in that the vehicle comprises processing means (24) calculating the gradient α with respect to the horizontal as determined by the formula:

$$\alpha = \operatorname{Arc\,sin}((\gamma - g \, Kroll - K \, v^2/m_e)/g)$$

where γ is the measured acceleration of the vehicle, g=9.8 ms$^{-2}$, Kroll is the rolling resistance of the vehicle, K is the aerodynamic resistance of the vehicle, v is the speed of the vehicle and $m_e$ is the estimated mass of the vehicle.

3. Vehicle according to claim 1, characterized in that the vehicle comprises means for determining the mass m of the vehicle as a function of the measured gradient.

4. Vehicle according to claim 1, characterized in that the vehicle comprises a hydraulic control unit for operating hydraulic brakes which are positioned at the wheels (22) in order individually to reduce the rotational speed of the wheels (22) when this speed exceeds the speed desired for ensuring that the vehicle follows the path desired by the driver.

5. Vehicle according to claim 2, characterized in that the vehicle comprises means for determining the mass m of the vehicle as a function of the measured gradient.

6. Vehicle according to claim 2, characterized in that the vehicle comprises a hydraulic control unit for operating hydraulic brakes which are positioned at the wheels (22) in order individually to reduce the rotational speed of the wheels (22) when this speed exceeds the speed desired for ensuring that the vehicle follows the path desired by the driver.

7. Vehicle according to claim 3, characterized in that the vehicle comprises a hydraulic control unit for operating hydraulic brakes which are positioned at the wheels (22) in order individually to reduce the rotational speed of the wheels (22) when this speed exceeds the speed desired for ensuring that the vehicle follows the path desired by the driver.

8. Vehicle according to claim 5, characterized in that the vehicle comprises a hydraulic control unit for operating hydraulic brakes which are positioned at the wheels (22) in order individually to reduce the rotational speed of the wheels (22) when this speed exceeds the speed desired for ensuring that the vehicle follows the path desired by the driver.

9. Vehicle comprising an engine (12), a clutch (E), wheels (22) and a sensor operable to monitor the rotational speed of the wheels, characterized in that the vehicle comprises a processor operable to measure the gradient $\alpha$ of the vehicle by measuring the acceleration $\gamma$ of the vehicle running along the gradient, with the engine (12) disengaged.

10. Vehicle according to claim 9, characterized in that the processor is operable to calculate the gradient $\alpha$ with respect to the horizontal as determined by the formula:

$$\alpha = \text{Arc } \sin((\gamma - g \text{ Kroll} - K v^2/m_e)/g)$$

where $\gamma$ is the measured acceleration of the vehicle, $g=9.8$ ms$^{-2}$, Kroll is the rolling resistance of the vehicle, K is the aerodynamic resistance of the vehicle, v is the speed of the vehicle and $m_e$ is the estimated mass of the vehicle.

11. Vehicle according to claim 9, characterized in that the vehicle comprises means for determining the mass m of the vehicle as a function of the measured gradient.

12. Vehicle according to claim 9, characterized in that the vehicle comprises a hydraulic control unit for operating hydraulic brakes which are positioned at the wheels (22) in order individually to reduce the rotational speed of the wheels (22) when this speed exceeds the speed desired for ensuring that the vehicle follows the path desired by the driver.

13. System for a vehicle, the vehicle including an engine (12), a clutch (E), wheels (22) and a sensor operable to monitor the rotational speed of the wheels, the system comprising a processor operable to measure the gradient $\alpha$ of the vehicle by measuring the acceleration $\gamma$ of the vehicle running along the gradient, with the engine (12) disengaged.

14. System according to claim 13, characterized in that the processor is operable to calculate the gradient $\alpha$ with respect to the horizontal as determined by the formula:

$$\alpha = \text{Arc } \sin((\gamma - g \text{ Kroll} - K v^2/m_e)/g)$$

where $\gamma$ is the measured acceleration of the vehicle, $g=9.8$ ms$^{-2}$, Kroll is the rolling resistance of the vehicle, K is the aerodynamic resistance of the vehicle, v is the speed of the vehicle and $m_e$ is the estimated mass of the vehicle.

15. System according to claim 13, characterized in that the processor is operable to determine the mass m of the vehicle as a function of the measured gradient.

* * * * *